June 3, 1969      R. L. MINTER      3,447,854
THREE-DIMENSIONAL VIEWER
Filed Aug. 18, 1965
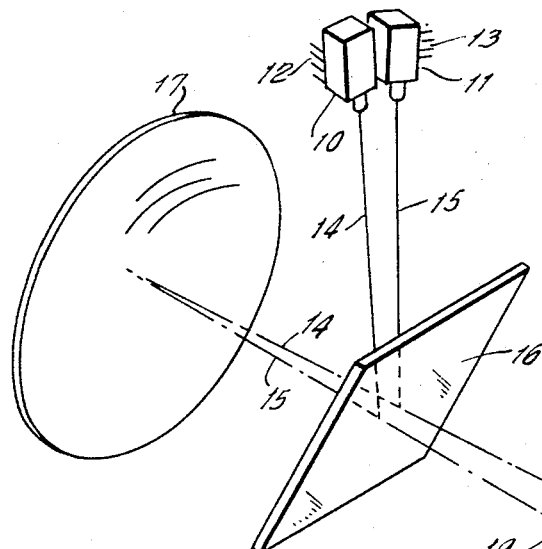
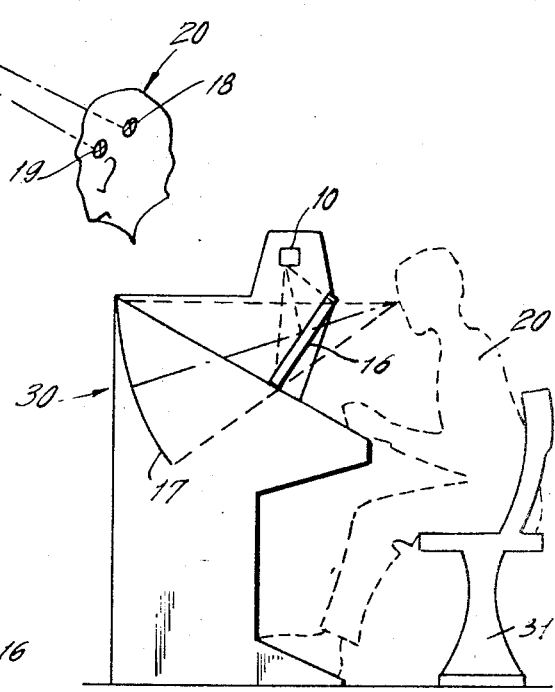
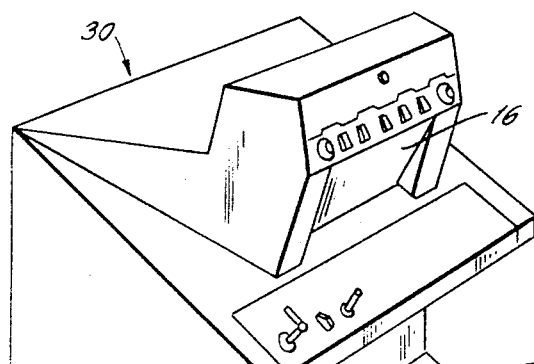
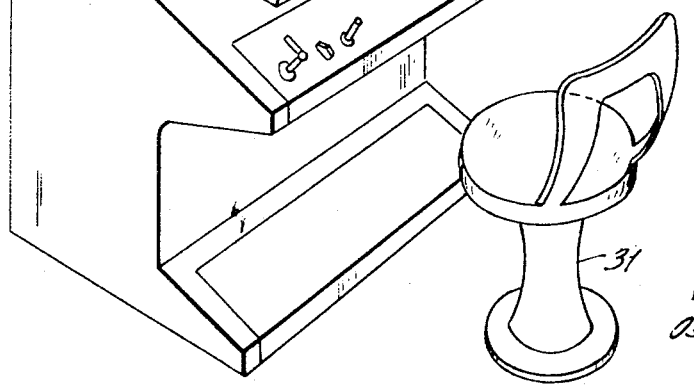
INVENTOR.
ROBERT L. MINTER
BY
OSTROLENK, FABER, GERB & SOFFEN
ATTORNEYS

United States Patent Office 3,447,854
Patented June 3, 1969

3,447,854
THREE-DIMENSIONAL VIEWER
Robert L. Minter, Smithtown, N.Y., assignor to Kollsman Instrument Corporation, Elmhurst, N.Y., a corporation of New York
Filed Aug. 18, 1965, Ser. No. 480,584
Int. Cl. G03b 27/22; G02b 17/00
U.S. Cl. 350—131                             3 Claims

ABSTRACT OF THE DISCLOSURE

A three-dimensional viewer is disclosed wherein a pair of projectors direct converging right and left hand image beams along coplanar optical axes of predetermined angular relation, a beam splitting mirror intercepts and redirects the converging beams toward a crossover point, a spherical reflector of concave form disposed at or adjacent the crossover point acts as a field lens to reflect the image beams through the beam splitting mirror in a transposed, divergent axis relationship to define two exit pupils at the viewing position.

---

This invention relates to a novel three-dimensional viewing system, and more particularly relates to a novel three-dimensional viewing system which is a virtual image system not employing a screen wherein two separate images are directed toward a beam splitter to focus at or near the radius of a spherical mirror, whereupon the two images are reflected back through the beam splitter to define two spaced exit pupils at which the observer places his eyes.

Various systems have been used to permit viewing by separate eyes of an observer of two respective flat objects or transparencies which show the same scene from different angles so that the scene to the observer will appear to be three-dimensional. One example of this is the well-known stereoscopic viewer in which two photographs are observed through respective lenses, whereupon each eye sees the same view which was taken from a different angle, thereby forming the three-dimensional effect.

Systems of this type have the disadvantage of requiring precise placement of the eyes, and additionally require prism systems where wide fields of view are desired.

Other systems which are well-known are those wherein two separate pictures are displayed upon a screen with light beams that selectively differ from one another in color or polarization. Thus, the viewer may wear glasses that are either different color filters or are polarized in different directions so that one eye will receive the image from the first projector, while the other eye receives the image from the second projector.

The present invention is directed to a novel three-dimensional display system which does not require the observer to wear special glasses or lenses, and which permits some freedom of motion of the head in viewing the display.

More particularly, and in accordance with the invention, a pair of projectors which project the same scene taken from different angles (often referred to as a stereo pair) are arranged above a beam splitting miror which reflects the two scenes (i.e., the stereo pair) toward a concave reflecting mirror. The concave reflecting mirror is contained approximately in the plane where the optical axes of the projectors intersect, and acts as a field lens to reflect these two beams back through the beam splitter to define two spaced exit pupils where an observer may place his eyes to observe the images of the two respective cameras with his two eyes respectively. Therefore, the observer will have a three-dimensional view of the scene projected without the inconvenience of special glasses while retaining the convenience of some head motion.

The novel system of the invention permits of numerous convenient adjustments for the eye of a particular observer, where, for example, the focal length of the projector can be altered so that the focus falls slightly behind or in front of the spherical mirror, thereby to adjust for the particular vision of the observer.

For minimal distortion, the porjectors may be located at the center of curvature of the spherical mirror although this arrangement may be varied for special purposes permitting the spherical mirror to become a part of the projection lens system to produce larger or smaller fields of view. Clearly, the direction in which the beams are projected from the projectors may be slightly altered to accommodate the different spacing between eyes of different observers.

In addition, the convergence angle between the two projectors may be altered for special scaling effects. The system is ideally appicable to mensuration or the measurement of an object in the display in any of three directions. Clearly, suitable measuring systems well-known to those skilled in the art can be directy applied to the system for mensuration techniques where measurements could occur either by suitable servo systems or manually.

As pointed out above, the exit pupils are spaced from one another, and will have a small enough diameter to prevent two images from reaching one eye. By way of example, the diameter of the exit pupils is preferably less than two inches. This two-inch dimension will also define the amount of head movement that is permissible with the system.

Where greater head freedom is needed, polarization techniques and special glasses would be required in combination with the present system to prevent confusion of images.

Accordingly, a primary object of this invention is to provide an improved three-dimensional veiwing system.

Another object of this invention is to provide a novel three-dimensional viewing system which provides a less restricted amount of head movement and eliminates the need for special glasses.

A further object of this invention is to provide a novel three-dimensional viewing system which lends itself to mensuration techniques.

A further object of this invention is to provide a novel three-dimensional viewing system which is suitable for opthamology, both research and field application wherein remotely variable convergence would strengthen weak eye muscles; calibrated projection lenses would measure myopia and other visual defects; and dominent eye determinations could be made by separate eye brightness control.

These and other objects of this invention will become apparent from the following description when taken in connection with the drawings, in which:

FIGURE 1 is a schematic perspective view of the novel three-dimensional viewing system of the invention.

FIGURE 2 is a perspective view of the housing for containing the system of FIGURE 1.

FIGURE 3 is a schematic view taken through the housing or console of FIGURE 2 to illustrate the placement of the components of FIGURE 1 and the position of an observer.

Referring now to FIGURE 1, I have illustrated therein the novel system as including two projectors 10 and 11 which project images of a scene taken from different angles. Note that the projectors 10 and 11 may be of any desired type and could include slide projectors, television systems, moving picture systems, and the like.

It should be further noted that the projectors are fixed in fixed supports schematically illustrated as supports 12 and 13, although the projectors are angularly adjustable with respect to one another, and can be individually focused.

Projectors 10 nd 11 then project converging beams 14 and 15, respectively, toward a beam splitter 16 which reflects a portion of the light incident thereupon toward a spherical mirror 17. The spherical mirror or reflector 17 then lies at the convergence point of beams 14 and 15.

The beams 14 and 15 are then reflected from the mirror and through the beam splitter 16 to define two exit pupils 18 and 19, respectively, at which an observer 20 will pace his eyes. Therefore, the observer's right eye will observe the picture displayed from projector 10, while the left eye will observe the picture displayed from projector 11.

The manner in which the arrangement of FIGURE 1 is contained in a console is shown in FIGURES 2 and 3. Thus, in FIGURES 2 and 3, a console housing 30 is provided which has a chair 31 for the observer 20. Suitable controls are provided, which do not form a part of the present invention, for the control of the projectors and the movement of various measuring indicia used for mensuration techniques. Note that the complete assembly is contained within the console 30, and the console mounts beam splitter 16 through which the light beams 14 and 15 pass to the observer's eyes.

The present invention has been successfully operated in a system wherein the spherical mirror 17 was a circular mirror having a diameter of 26 inches, and a focal length of 30 inches. Each of the two projectors 10 and 11 were standard slide projectors having three-inch focal length lenses. The beam splitter 16 was a half silvered 50—50 beam splitter mirror. The diameter of the exit pupils 18 and 19 was held to less than two inches since greater diameters caused overlapping of the exit pupils, whereby one eye would receive two images.

Although the invention has been described with respect to the preferred embodiments thereof, it should be understood that many variations and modifications will now be obvious to those skilled in the art, and it is preferred, therefore, that the scope of the invention be limited not by the specific disclosure thereof, but only by the appended claims.

The embodiments of the invention in which an exclusive privilege or property is claimed are defined as follows:

1. A three-dimensional veiwer comprising first and second projectors for continuously forming a stereo pair of images, said projectors being adjustably spaced from one another and having first and second converging axes; a halftone beam splitter at an angle to the plane defined by the axes of said first and second projectors; a spherical reflector acting as a field lens; said beam splitter directing the image from said first and second projectors to said spherical reflector; the optical axes of said first and second projectors intersecting and crossing over one another approximately in the plane of said spherical reflector whereby the image from the right projector is viewable by the left eye of a viewer while the image from the left projector is viewable by the right eye of the viewer; and an observation position defining exit pupil locations on the side of said beam splitter away from said spherical reflector for viewing the reflected images of said objects in spaced relation to one another so that the optical axes from said spherical reflector to the eyes of the viewer are slightly diverging; said images having a diameter of less than approximately 2 inches at said observation position.

2. The device as set forth in claim 1 wherein said projectors are spaced from said spherical reflector a distance substantially equal to the radius of curvature of said spherical reflector.

3. The device as set forth in claim 1 wherein said spherical reflector has a thirty inch focal length and a twenty-six inch diameter.

References Cited

UNITED STATES PATENTS

| | | | |
|---|---|---|---|
| 2,889,739 | 6/1959 | Moore | 350—131 |
| 2,891,444 | 6/1959 | Ewald | 350—131 |
| 3,205,303 | 9/1965 | Bradley | 35—12 |
| 2,045,120 | 6/1936 | Carpenter | 352—61 X |
| 3,083,612 | 4/1963 | Miller | 350—132 X |
| 3,200,702 | 8/1965 | Giordano | 352—61 X |

FOREIGN PATENTS 57,529 1/1953 France.
(1st add. to 1,002,506)

DAVID SCHONBERG, *Primary Examiner.*

PAUL R. GILLIAM, *Assistant Examiner.*

U.S. Cl. X.R.

350—27, 133, 138, 139